(12) United States Patent
Eberlein et al.

(10) Patent No.: US 11,354,302 B2
(45) Date of Patent: Jun. 7, 2022

(54) AUTOMATIC CREATION AND SYNCHRONIZATION OF GRAPH DATABASE OBJECTS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/902,690

(22) Filed: Jun. 16, 2020

(65) Prior Publication Data

US 2021/0390090 A1 Dec. 16, 2021

(51) Int. Cl.
*G06F 16/23* (2019.01)
*G06F 16/28* (2019.01)
*G06F 16/21* (2019.01)

(52) U.S. Cl.
CPC ........ *G06F 16/2379* (2019.01); *G06F 16/212* (2019.01); *G06F 16/284* (2019.01)

(58) Field of Classification Search
CPC .. G06F 16/2379; G06F 16/284; G06F 16/212; G06F 16/282; G06F 16/27
USPC ...................................................... 707/737
See application file for complete search history.

(56) References Cited

U.S. PATENT DOCUMENTS

| 7,523,142 | B2 | 4/2009 | Driesen et al. |
| 7,657,575 | B2 | 2/2010 | Eberlein et al. |
| 7,720,992 | B2 | 5/2010 | Brendle et al. |
| 2,199,904 | A1 | 6/2010 | Eberlein et al. |
| 7,739,387 | B2 | 6/2010 | Eberlein et al. |
| 7,971,209 | B2 | 6/2011 | Eberlein et al. |
| 8,126,919 | B2 | 2/2012 | Eberlein |
| 8,200,634 | B2 | 6/2012 | Driesen et al. |
| 8,225,303 | B2 | 7/2012 | Wagner et al. |
| 8,250,135 | B2 | 8/2012 | Driesen et al. |
| 8,291,038 | B2 | 10/2012 | Driesen |
| 8,301,610 | B2 | 10/2012 | Driesen et al. |
| 8,356,010 | B2 | 1/2013 | Driesen |
| 8,375,130 | B2 | 2/2013 | Eberlein et al. |
| 8,380,667 | B2 | 2/2013 | Driesen |
| 8,392,573 | B2 | 3/2013 | Lehr et al. |

(Continued)

OTHER PUBLICATIONS

U.S. Appl. No. 15/847,627, Boer et al., filed Dec. 19, 2017.

(Continued)

*Primary Examiner* — Kuen S Lu
(74) *Attorney, Agent, or Firm* — Fish & Richardson P.C.

(57) ABSTRACT

A request is received to create a graph database from one or more relational databases. For each relational database, data objects in the relational database are identified. For each data object, a graph data object corresponding to the data object is created. The graph data object is linked to the data object. A set of associated data objects in the relational database are determined, and for each associated data object, an associated graph data object is created if a graph data object corresponding to the data object does not exist. For each created graph data object, a graph data relation object is created that represents a relationship between the graph data object and the associated graph data object. Created graph data objects, associated graph data objects, and graph data relation objects are stored in the graph database. The graph database is provided to one or more applications.

19 Claims, 10 Drawing Sheets

(56) References Cited

U.S. PATENT DOCUMENTS

| | | |
|---|---|---|
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,479,187 B2 | 7/2013 | Driesen et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,631,406 B2 | 1/2014 | Driesen et al. |
| 8,645,483 B2 | 2/2014 | Odenheimer et al. |
| 8,706,772 B2 | 4/2014 | Hartig et al. |
| 8,732,083 B2 | 5/2014 | Vasing et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,031,910 B2 | 5/2015 | Driesen |
| 9,032,406 B2 | 5/2015 | Eberlein |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,336,227 B2 | 5/2016 | Eberlein et al. |
| 9,348,929 B2 | 5/2016 | Eberlein |
| 9,354,860 B2 | 5/2016 | Eberlein et al. |
| 9,354,871 B2 | 5/2016 | Eberlein et al. |
| 9,361,093 B2 | 6/2016 | Meissner et al. |
| 9,361,326 B2 | 6/2016 | Driesen et al. |
| 9,367,199 B2 | 6/2016 | Klemenz et al. |
| 9,372,685 B1 | 6/2016 | Luettge et al. |
| 9,436,724 B2 | 9/2016 | Driesen et al. |
| 9,471,659 B2 | 10/2016 | Driesen et al. |
| 9,501,516 B2 | 11/2016 | Driesen |
| 9,519,675 B2 | 12/2016 | Specht et al. |
| 9,569,283 B2 | 2/2017 | Eberlein |
| 9,632,802 B2 | 4/2017 | Said et al. |
| 9,633,107 B2 | 4/2017 | Said et al. |
| 9,639,448 B2 | 5/2017 | Gebhard et al. |
| 9,652,214 B1 | 5/2017 | Eberlein |
| 9,652,744 B2 | 5/2017 | Eberlein et al. |
| 9,672,140 B1 | 6/2017 | Eberlein |
| 9,678,740 B2 | 6/2017 | Heine et al. |
| 9,703,554 B2 | 7/2017 | Eberlein et al. |
| 9,720,994 B2 | 8/2017 | Driesen et al. |
| 9,721,116 B2 | 8/2017 | Driesen et al. |
| 9,740,476 B2 | 8/2017 | Eberlein et al. |
| 9,767,424 B2 | 9/2017 | Biewald et al. |
| 9,800,689 B2 | 10/2017 | Said et al. |
| 9,836,299 B2 | 12/2017 | Eberlein et al. |
| 9,854,045 B2 | 12/2017 | Said et al. |
| 9,858,309 B2 | 1/2018 | Eberlein et al. |
| 9,875,273 B2 | 1/2018 | Eberlein et al. |
| 9,898,279 B2 | 2/2018 | Eberlein et al. |
| 9,898,494 B2 | 2/2018 | Eberlein et al. |
| 9,898,495 B2 | 2/2018 | Eberlein et al. |
| 9,927,992 B2 | 3/2018 | Driesen et al. |
| 10,013,337 B2 | 7/2018 | Eberlein et al. |
| 10,025,568 B2 | 7/2018 | Mayer et al. |
| 10,055,215 B2 | 8/2018 | Specht et al. |
| 10,061,788 B2 | 8/2018 | Said et al. |
| 10,083,061 B2 | 9/2018 | Odenheimer et al. |
| 10,120,886 B2 | 11/2018 | Eberlein et al. |
| 10,157,052 B2 | 12/2018 | Eberlein et al. |
| 10,157,068 B2 | 12/2018 | Arians et al. |
| 10,185,552 B2 | 1/2019 | Eberlein et al. |
| 10,187,393 B2 | 1/2019 | Odenheimer et al. |
| 10,191,733 B2 | 1/2019 | Driesen |
| 10,230,708 B2 | 3/2019 | Eberlein |
| 10,268,472 B2 | 4/2019 | Eberlein et al. |
| 10,268,692 B2 | 4/2019 | Mayer et al. |
| 10,270,743 B2 | 4/2019 | Eberlein |
| 10,291,704 B2 | 5/2019 | Eberlein et al. |
| 10,296,324 B2 | 5/2019 | Burkhardt et al. |
| 10,298,591 B2 | 5/2019 | Eberlein et al. |
| 10,303,665 B2 | 5/2019 | Engelko et al. |
| 10,311,077 B2 | 6/2019 | Specht et al. |
| 10,437,795 B2 | 10/2019 | Eberlein et al. |
| 10,452,646 B2 | 10/2019 | Schlarb et al. |
| 2006/0171405 A1 | 8/2006 | Brendle et al. |
| 2007/0185720 A1 | 8/2007 | Eberlein et al. |
| 2007/0239800 A1 | 10/2007 | Eberlein |
| 2008/0222248 A1 | 9/2008 | Eberlein et al. |
| 2009/0106371 A1 | 4/2009 | Schmidt-Karaca et al. |
| 2009/0106372 A1 | 4/2009 | Schmidt-Karaca et al. |
| 2009/0150479 A1 | 6/2009 | Eberlein et al. |
| 2009/0172110 A1 | 7/2009 | Eberlein et al. |
| 2010/0161648 A1 | 6/2010 | Eberlein et al. |
| 2011/0154445 A1 | 6/2011 | Schmidt-Karaca et al. |
| 2012/0136839 A1 | 5/2012 | Eberlein et al. |
| 2012/0159435 A1 | 6/2012 | Driesen et al. |
| 2012/0023125 A1 | 10/2012 | Driesen et al. |
| 2013/0085810 A1 | 4/2013 | Driesen et al. |
| 2013/0144945 A1 | 6/2013 | Said et al. |
| 2013/0166415 A1 | 6/2013 | Odenheimer et al. |
| 2013/0166416 A1 | 6/2013 | Eberlein |
| 2013/0324201 A1 | 12/2013 | Eberlein et al. |
| 2013/0325672 A1 | 12/2013 | Odenheimer et al. |
| 2013/0339488 A1 | 12/2013 | Eberlein et al. |
| 2014/0019429 A1 | 1/2014 | Driesen et al. |
| 2014/0025441 A1 | 1/2014 | Eberlein et al. |
| 2014/0047319 A1 | 2/2014 | Eberlein |
| 2014/0117076 A1 | 5/2014 | Eberlein |
| 2014/0149158 A1 | 5/2014 | Odenheimer et al. |
| 2014/0156724 A1 | 6/2014 | Said et al. |
| 2014/0164963 A1 | 6/2014 | Klemenz et al. |
| 2014/0201234 A1* | 7/2014 | Lee .................. G06F 16/24534 707/769 |
| 2014/0325069 A1 | 10/2014 | Odenheimer et al. |
| 2015/0006608 A1 | 1/2015 | Eberlein et al. |
| 2015/0081739 A1* | 3/2015 | Xu .................. G06F 16/9024 707/792 |
| 2015/0188890 A1 | 7/2015 | Said et al. |
| 2015/0220576 A1 | 8/2015 | Eberlein |
| 2015/0220591 A1 | 8/2015 | Eberlein et al. |
| 2015/0222665 A1 | 8/2015 | Eberlein et al. |
| 2016/0026698 A1 | 1/2016 | Eberlein et al. |
| 2016/0063050 A1 | 3/2016 | Schoen et al. |
| 2016/0098253 A1 | 4/2016 | Hutzel et al. |
| 2016/0127325 A1 | 5/2016 | Odenheimer et al. |
| 2017/0053294 A1* | 2/2017 | Yang .................. G06F 16/9024 |
| 2017/0103226 A1 | 4/2017 | Eberlein et al. |
| 2017/0116296 A1 | 4/2017 | Specht et al. |
| 2017/0161291 A1 | 6/2017 | Specht et al. |
| 2017/0161511 A1 | 6/2017 | Eberlein et al. |
| 2017/0286467 A1 | 10/2017 | Eberlein et al. |
| 2017/0329505 A1 | 11/2017 | Richter et al. |
| 2017/0344362 A1 | 11/2017 | Burkhardt et al. |
| 2017/0351442 A1 | 12/2017 | Specht et al. |
| 2018/0041568 A1 | 2/2018 | Eberlein |
| 2018/0081668 A1 | 3/2018 | Eberlein |
| 2018/0095953 A1 | 4/2018 | Mayer et al. |
| 2018/0129676 A1 | 5/2018 | Eberlein et al. |
| 2018/0137010 A1 | 5/2018 | Mayer et al. |
| 2018/0137145 A1 | 5/2018 | Mayer et al. |
| 2018/0137146 A1 | 5/2018 | Mayer et al. |

(56) References Cited

U.S. PATENT DOCUMENTS

| | | | |
|---|---|---|---|
| 2018/0144117 | A1 | 5/2018 | Engler et al. |
| 2018/0146056 | A1 | 5/2018 | Eberlein |
| 2018/0268154 | A1 | 9/2018 | Specht et al. |
| 2018/0285097 | A1 | 10/2018 | Radermacher et al. |
| 2018/0285390 | A1 | 10/2018 | Mayer et al. |
| 2018/0300332 | A1 | 10/2018 | Odenheimer et al. |
| 2018/0316685 | A1 | 11/2018 | Eberlein et al. |
| 2018/0316772 | A1 | 11/2018 | Eberlein et al. |
| 2018/0329930 | A1 | 11/2018 | Eberlein et al. |
| 2018/0331927 | A1 | 11/2018 | Eberlein et al. |
| 2018/0336365 | A1 | 11/2018 | Eberlein et al. |
| 2018/0373767 | A1 | 12/2018 | Specht et al. |
| 2019/0007420 | A1 | 1/2019 | Eberlein et al. |
| 2019/0018874 | A1 | 1/2019 | Eberlein et al. |
| 2019/0034460 | A1 | 1/2019 | Eberlein |
| 2019/0129985 | A1 | 5/2019 | Schlarb et al. |
| 2019/0129986 | A1 | 5/2019 | Birn et al. |
| 2019/0129988 | A1 | 5/2019 | Auer et al. |
| 2019/0129990 | A1 | 5/2019 | Schlarb et al. |
| 2019/0129991 | A1 | 5/2019 | Auer et al. |
| 2019/0129997 | A1 | 5/2019 | Auer et al. |
| 2019/0130010 | A1 | 5/2019 | Auer et al. |
| 2019/0130121 | A1 | 5/2019 | Birn et al. |
| 2019/0166209 | A1 | 5/2019 | Mueller et al. |
| 2019/0190912 | A1 | 6/2019 | De boer et al. |
| 2019/0207922 | A1 | 7/2019 | Eberlein |
| 2019/0220289 | A1 | 7/2019 | Driesen et al. |
| 2019/0220529 | A1 | 7/2019 | Eberlein et al. |
| 2019/0238426 | A1 | 8/2019 | Eberlein |
| 2019/0340260 | A1 | 11/2019 | Eberlein et al. |
| 2021/0081848 | A1* | 3/2021 | Polleri ............... G06F 16/9024 |

OTHER PUBLICATIONS

U.S. Appl. No. 15/874,317, Eberlein et al, filed Jan. 18, 2018.
U.S. Appl. No. 15/883,680, Eberlein, filed Jan. 30, 2018.
U.S. Appl. No. 15/970,499, Eberlein et al, filed May 3, 2018.
U.S. Appl. No. 15/983,469, Driesen et al., filed May 18, 2018.
U.S. Appl. No. 15/983,812, Eberlein et al, filed May 18, 2018.
U.S. Appl. No. 15/996,804, Hauck et al., filed Jun. 4, 2018.
U.S. Appl. No. 16/005,927, Kruempelmann et al., filed Jun. 12, 2018.
U.S. Appl. No. 16/173,225, Eberlein et al, filed Oct. 29, 2018.
U.S. Appl. No. 16/197,888, Meissner et al., filed Nov. 21, 2018.
U.S. Appl. No. 16/200,427, Mueller et al., filed Nov. 26, 2018.
U.S. Appl. No. 16/208,920, Eberlein et al, filed Dec. 4, 2018.
U.S. Appl. No. 16/214,724, Eberlein et al, filed Dec. 10, 2018.
U.S. Appl. No. 16/219,358, Eberlein et al, filed Dec. 13, 2018.
U.S. Appl. No. 16/219,371, Eberlein et al, filed Dec. 13, 2018.
U.S. Appl. No. 16/219,375, Eberlein, filed Dec. 13, 2018.
U.S. Appl. No. 16/297,057, Eberlein, filed Mar. 8, 2019.
U.S. Appl. No. 16/402,453, Eberlein, filed May 3, 2019.
U.S. Appl. No. 16/410,076, Eberlein et al, filed May 13, 2019.
U.S. Appl. No. 16/455,072, Eberlein et al, filed Jun. 27, 2019.
U.S. Appl. No. 16/521,642, Eberlein et al, filed Jul. 25, 2019.
U.S. Appl. No. 16/580,318, Eberlein et al, filed Sep. 24, 2019.
U.S. Appl. No. 16/688,941, Auer et al., filed Nov. 19, 2019.
U.S. Appl. No. 16/834,838, Eberlein et al., filed Mar. 30, 2020.
U.S. Appl. No. 16/848,961, Eberlein, filed Apr. 15, 2020.
U.S. Appl. No. 16/860,532, Auer et al., filed Apr. 28, 2020.
U.S. Appl. No. 16/896,407, Misch et al., filed Jun. 9, 2020.
U.S. Appl. No. 16/902,690, Eberlein et al., filed Jun. 16, 2020.
Developer.IBM.com [online], "No More Joins: An Overview of Graph Database Query Languages" available on or before Jul. 4, 2017 via Internet Archive: Wayback Machine URL <https://web.archive.org/web/20170704050129/https://developer.ibm.com/dwblog/2017/overview-graph-database-query-languages/>, retrieved on Sep. 10, 2020,URL <https://developer.ibm.com/dwblog/2017/overview-graph-database-query-languages/>, 6 pages.
Dzone.com [online], "What Art the Major Advantages of Using A Graph Database?", Oct. 2019, [retrieved on Sep. 10, 2020], retrieved from: URL <https://dzone.com/articles/what-are-the-pros-and-cons-of-using-a-graph-databa>, 5 pages.
Iais.fraunhofer.de [online], "Enterprise Knowledge Graphs" Mar. 2020, [retrieved on Sep. 10, 2020], retrieved from: URL <https://www.iais.fraunhofer.de/en/business-areas/enterprise-information-integration/enterprise-knowledge-graphs.html>, 5 pages.
Magma.maths.usyd.edu.au [online], "Handbook: Graphs", Mar. 2012, [retrieved on Sep. 10, 2020], retrieved from: URL <https://magma.maths.usyd.edu.au/magma/handbook/graphs>, 3 pages.
Neo4j.com [online], "Concepts: Relational to Graph" Oct. 2014, [retrieved on Sep. 10, 2020], retrieved from: URL <https://neo4j.com/developer/graph-db-vs-rdbms/>, 8 pages.
Orientdb.org [online], "Transformers", Oct. 2016, [retrieved on Sep. 10, 2020], retrieved from: URL <https://orientdb.org/docs/2.1.x/Transformer.html>, 9 pages.
SAP.com[online], "SAP HANA Core Data Services", Nov. 2016 [retrieved on Sep. 10, 2020], retrieved from: URL <https://help.sap.com/doc/29ff91966a9f46ba85b61af337724d31/2.0.00/en-US/SAP_HANA_Core_Data_Services_CDS_Reference_en.pdf>, 300 pages.
Wolfram.com [online], "Graph Operations and Modifications" Aug. 2014, [retrieved on Sep. 10, 2020], retrieved from: URL <https://reference.wolfram.com/language/guide/GraphModifications.html>, 2 pages.

* cited by examiner

AUTOMATIC CREATION AND SYNCHRONIZATION OF GRAPH DATABASE OBJECTS

BACKGROUND

Data objects that represent enterprise concepts can be modeled and used in enterprise applications. Data objects can be associated with other data objects. Accordingly, an association can model an inter-object relationship. Data objects can be persisted, for example, in a relational database. An association between two data objects can be stored, for example, as a foreign key relationship in the relational database.

SUMMARY

The present disclosure describes automatic creation and synchronization of graph database objects. In an implementation, a request is received to create a graph database from one or more relational databases. For each relational database, a set of data objects stored in the relational database is identified. For each data object stored in the relational database: a graph data object that corresponds to the data object is created; the graph data object is linked to the data object using an identifier of the data object; a graph data object identifier of the graph data object is provided for linking the graph data object to the data object; a set of associated data objects that are associated with the data object are determined; for each associated data object, an associated graph data object is created if a graph data object corresponding to the associated data object does not exist; and for each created graph data object, a graph data relation object is created that represents a relationship between the graph data object and the associated graph data object. Created graph data objects, associated graph data objects, and graph data relation objects are stored in the graph database. The graph database is provided to one or more applications.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a graph can be automatically created from a set of data objects stored in one or more databases. Second, an application can take advantage of graph database features, including graph traversal and query flexibility. Third, a graph database can be extended to include relationships between data objects of separate applications. Fourth, a graph database can be automatically synchronized with a relational database in response to a change in one or more objects in the relational database. Fifth, an application developer can determine, on a semantic data object level, what relational database data is replicated to a graph database. Sixth, an application developer can interact with a graph object replicated from a corresponding data object using an interface that is similar to the corresponding data object.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
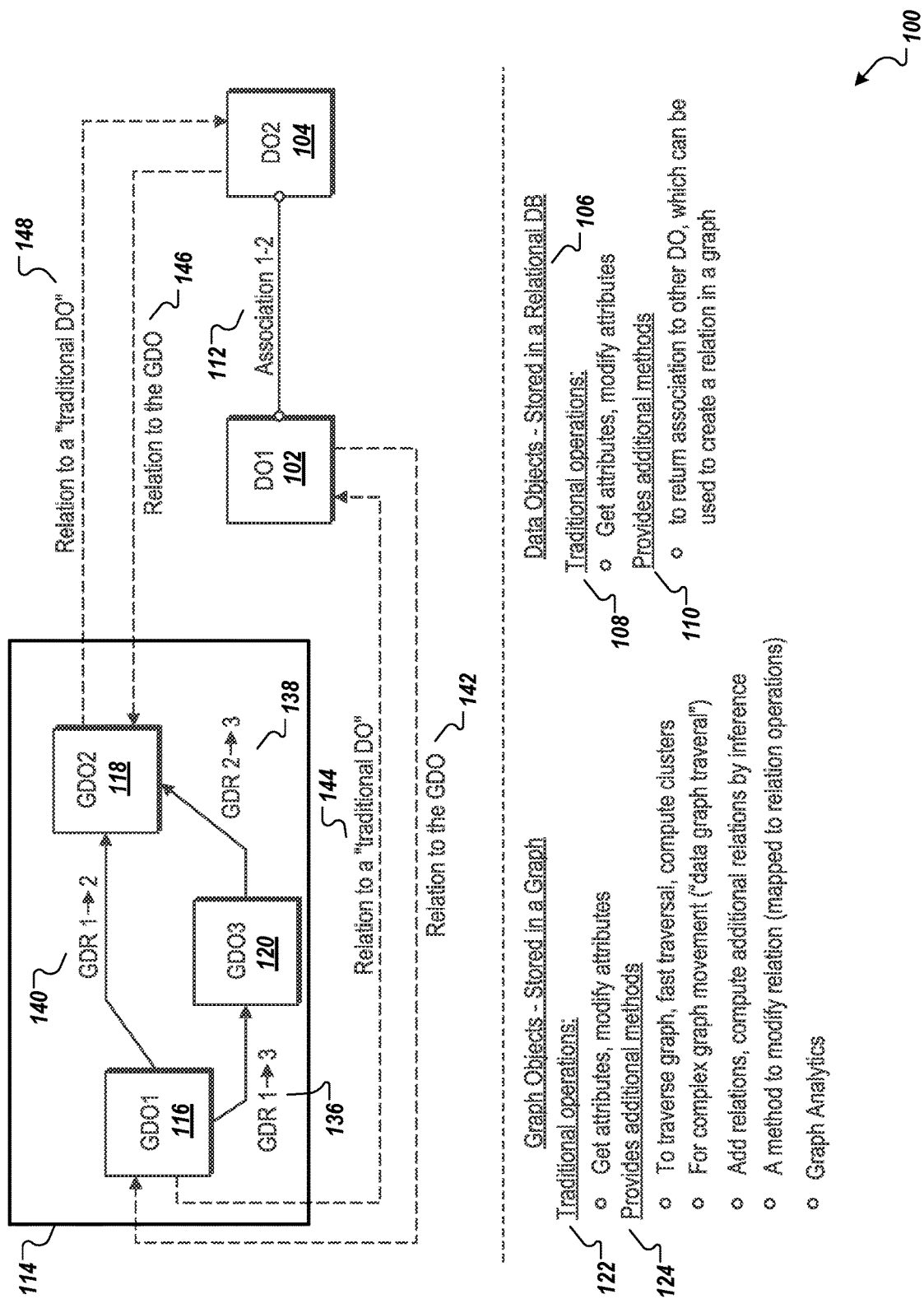
FIG. 1 is a block diagram illustrating an example of a system for creating a graph database based on data objects, according to an implementation of the present disclosure.

The following detailed description describes automatic creation and synchronization of graph database objects, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In a modern interconnected world, integration between enterprise or other types of applications can be important for organizations. Relationships between datasets relevant in an enterprise can be varied and extensive, for example, and difficult to capture. An Enterprise Knowledge Graph (EKG) can be used for efficient management of enterprise data. However, integrating existing enterprise applications into an EKG can be challenging and resource-intensive. For instance, a manual update of an EKG after an update to a relational database or other object store may be required.

Alternatively, a systematic approach described herein can be used to automatically provide the benefits of a EKG (which can be referred to as a data graph) to enterprise applications. A data graph can include two types of modeled objects: a Graph Data Object (GDO) and a Graph Data Relation (GDR). GDO and GDR instances can be persisted using a graph database.

A creation process can be automatically performed by a framework, for creating GDO and GDR instances from enterprise data objects (DO) that are stored, for example, in relational database(s). For instance, graph vertices can be derived from objects and entities in the relational database(s) and created as GDO instances in the data graph. Relationships can be determined from object associations and relational database foreign key relationships and can be stored as GDR instances in the data graph. Changes to DO instances can be automatically replicated by the framework to corresponding GDOs to keep DOs and GDOs in sync. Additionally, GDO and GDR methods can be used for enforcement of consistency constraints for individual GDO types.

The data graph can be a consistent representation of a set of objects created and stored by an application. Different applications (with separate databases) that each store DOs can be connected to a data graph that includes a superset of objects of different applications and databases. Additionally, the data graph can be extended by additional objects, that are not created from replication of DOs of an application, that represent relationships between applications. The additional GDOs can be linked, using GDRs, to GDOs that have been replicated from applications. Accordingly, otherwise disconnected graphs replicated from different applications can be interconnected in the data graph. Therefore, the data graph can enable access to enterprise data that is modeled as data objects that are stored in multiple relational databases spread across various systems. Data objects can be related to other data objects (even in remote applications) and the relations between objects can be queried in a more generic form, using the data graph, than with a relational model. Objects can be analyzed in a graph without explicitly formulating data object to data object relations on a relational database level. With a data graph, it can be sufficient that objects are in some relationship to each other, without specification of a concrete path. Accordingly, queries can be formulated without restriction to a concrete relational path.

Graph object creation and updates from data objects can be triggered on a semantic data object basis, rather than at a relational database level. Accordingly, data object developers can control, based on logic and semantic decisions appropriate for the object, what data is replicated to a data graph. Developers can opt-in or opt-out of some or all data graph replication, for example.

Applications that utilize a data graph can interface with the data graph using GDO and GDR methods, with at least some of the methods being similar to corresponding methods in the related data object. GDO and DO linkage can be bi-directional, in that a change to a GDO can be automatically reflected in a corresponding data object. Bi-directional linkage can allow application developers to freely navigate between graph objects or data objects, performing operations on either type, depending on what a developer decides is easier, more efficient, or more appropriate.

The framework can support advanced scenarios including connecting entities that originate from different systems and are therefore not connected by foreign keys within a database but are more loosely related by reference identifiers. Application developers can rely on the framework for establishing such connections, rather than performing custom development.

The framework processing can go beyond simple evaluation of relational database schema information. For example, process integration relationships can be evaluated when creating a graph, thereby linking systems and not just databases, based on semantic object identifiers (for example, purchase order number/sales order number).

FIG. 1 is a block diagram illustrating an example of a system 100 for creating a graph database based on data objects, according to an implementation of the present disclosure. Data objects can represent instances of concepts in a processing system. Each data object can be instance of an object type, or class, for example. For instance, purchase order objects can represent instances of purchase orders in an enterprise system. The system 100 includes a first data object DO1 102 and a second data object DO2 104. As mentioned in a note 106, data for data objects can be stored in a relational database. As described in a note 108, data objects can provide operations (methods) to act on an object. Traditional operations can include retrieving and setting attributes of an object. Other operations can represent semantic operations on an object that may put an object into a different state, for example.

A note 110 indicates that data objects may provide other methods, such as methods to return or traverse associations to other data objects. For instance, the first data object DO1 102 can provide a method to return a reference to the second data object DO2 104, based on an association 112 between the two objects. In some implementations, the second data object DO2 104 can also provide a method, for returning a reference to the associated first data object DO1 102. The association 112 can be manifested as a foreign key relation in a relational database. Data object associations can be used to create a relation in a data graph between graph objects that correspond to data objects.

A data graph 114, for example, can include GDOs 116, 118, and 120 as graph vertices. The data graph 114 can be persisted in a graph database. The data graph 114 can be an EKG that can be used to model relations of different datasets in an enterprise, including objects or concepts that are related across systems or applications.

GDOs, as indicated by a note 122, can provide, like DOs, operations for retrieving and setting attributes. As described by a note section 124, GDOs and the data graph 114 can provide additional methods for graph traversal, beyond capabilities provided by DOs or a relational database. For instance, operations for graph traversal can be supported, including across an indefinite number of vertices or indirections in the data graph 114. The data graph 114 can enable traversing a longer path of relations in the graph more quickly, as compared to executing complex JOIN operations on a set of relational database tables. For example, a minimum spanning tree can be computed, and the data graph 114 can be analyzed for cycles and a shortest path between a given two vertices can be computed.

GDOs in the data graph 114 can be connected using GDRs. For example, a GDR 136 links the GDO 116 to the GDO 120, a GDR 138 links the GDO 120 to the GDO 118, and a GDR 140 links the GDO 116 to the GDO 118. A GDR can connect related GDOs. Relations can be added by linking two related GDOs, which can be less involved than, for example, establishing foreign key relationships in relational storage.

An automatic process can be performed to create GDOs and GDRs from data objects stored in relational database(s). For example, graph vertices can be derived from objects and entities in the relational database and created as GDOs in the data graph 114. For instance, the GDO 116 can be created from the first data object DO1 102 and the GDO 118 can be created from the second data object DO2 104. Associations 142 and 144 can link the first data object DO1 102 to the GDO 116 and the GDO 116 to the first data object DO1 102, respectively. Similarly, associations 146 and 148 can link the second data object DO2 104 to the GDO 118 and the GDO 118 to the second data object DO2 104, respectively. As described in more detail in following figures, bi-directional linking can enable keeping GDOs in sync with related DOs.

Relationships between GDOs can be determined from associations and foreign key relationships of corresponding data objects. Determined relationships can be created as GDRs in the data graph 114. For example, the GDR 140 can be created based on identification of the association 112. As described in more detail in following figures, GDOs can be created other than from an identification of a data object. For instance, the GDO 120 can be created as a concept that is known or is identified, that does not have a direct data object counterpart in a relational database. The GDO 120 can reflect application integration or relationship or a semantic concept from another system, for example. GDRs 136 and 138 can be created in response to determining that the GDO 120 is related to the GDO 116 and the GDO 118, respectively.

Figure 2:
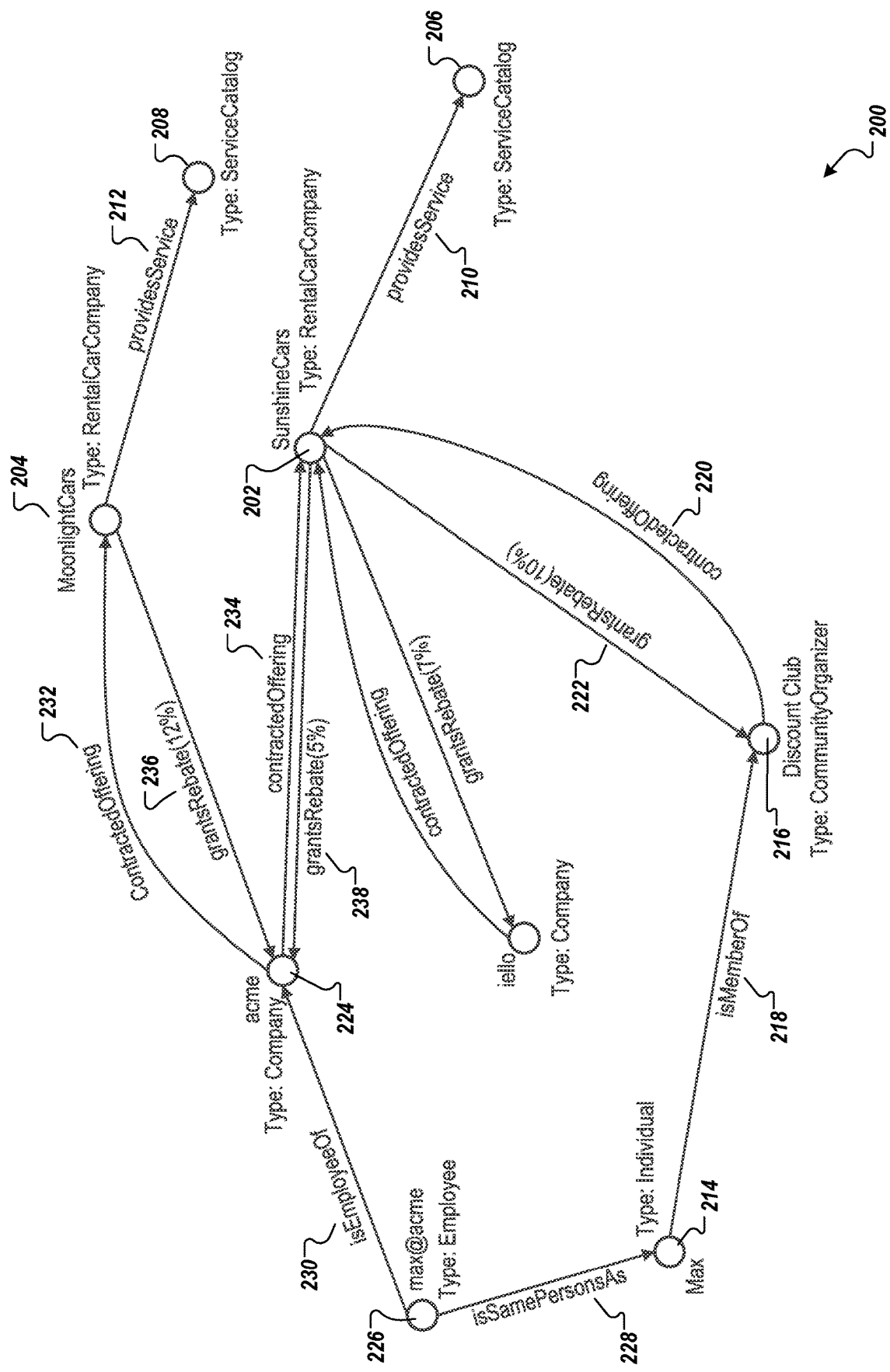
FIG. 2 is an example of a data graph representing an example marketplace, according to an implementation of the present disclosure.

FIG. 2 is an example of a data graph 200 representing an example marketplace, according to an implementation of the present disclosure. The marketplace can be for the management of rental car offerings and discounts. The example data graph 200 illustrates how information can be retrieved from the data graph 200 by following various paths, or indirections in the data graph 200. For example, one, two, three, or even four or more paths could be traversed when processing a query. To similarly solve a same problem using just a relational database, complex queries 202 would need to be crafted, often including unions of queries for different numbers of indirections. Such queries would be cumbersome and time consuming to create and maintain. For instance, a relational query that may handle four indirections may not work if five indirections are actually needed.

In further detail about the data graph 200, a rental car company can offer its services to companies and individuals. For example, the data graph 200 includes a GDO 202 representing a Sunshine Cars rental car company and a GDO 204 representing a Moonlight Cars rental car company. Each rental car company can have a service offering, which can be represented by a service catalog. A respective service catalog can be represented on the data graph 200 as a GDO and then linked to a corresponding car rental company GDO. For instance, service catalog GDOs 206 and 208 are linked to the GDO 202 or the GDO 204, using a GDR 210 or a GDR 212, respectively.

A rental car company can offer discounts to consumers. Discounts can be the same for all users or can be user-specific, and can be offered directly to users or a user can obtain a discount based on a membership in a discount club or community organizer group. For instance, a user Max, an individual represented by a GDO 214, is a member of a discount club represented by a GDO 216, with the membership being reflected by an is-member-of GDR 218. The discount club can have a contracted offering (reflected by a GDR 220) with the Sunshine Cars rental car company 202, for example. The contracted offering can result in a granting of a rebate of, for example, ten percent (as reflected by a GDR 222). The user Max can receive the ten percent discount at Sunshine Cars, based on the membership in the discount club.

Max is an employee of an Acme company represented by a GDO 224. Max can participate in the marketplace either as a private user or as an employee of the Acme company. Max as a private user may have different contact or identifying information than Max as an Acme employee. For instance, a GDO 226 represents Max as an employee. A GDR 228 reflects that Max as an employee is the same person as the private user Max. A GDR 230 reflects the employee-employer relationship of Max with the Acme company. A company can have a contract with a rental car company. For instance, as reflected by contracted-offering GDRs 232 and 234 and granted-discount GDRs 236 and 238, Acme has a contracted offering with both the Moonlight Cars rental car company and the Sunshine Cars rental car company that can result in discounts of twelve or five percent, respectively.

A car rental application can use the data graph 200 to determine car rental offers and associated discounts for a user such as Max. For example, when Max wants to rent a car, all paths of the data graph 200 from Max to a GDO of type "RentalCarCompany" can be traversed, with each corresponding identified rental car company offering a service available for Max. Out of the paths from Max to a RentalCarCompany GDO, all paths that have a relation "contractedOffering" can be identified, which can lead to identification of paths that have relations of type "grantRebate." A discount attribute of each "grantRebate" relation can be read to determine an available discount value. If two relations with a discount are passed in a same path the discount amounts can be added. Accordingly, traversal of the data graph 200 for Max can result in identification of offered services by Moonlight Cars with a discount of 12%, services of Sunshine Cars with a discount of 5% (from the Acme employer), and a 10% discount from the discount club. The application can thus show Max the offerings and the discounts that are applicable for Max, even if the offerings are facilitated through different organizations. The application can work unchanged, even as additional nodes (reflecting other discounts and companies) are added to the data graph 200.

The data graph 200 can be a standalone data structure that is not based on data objects. However, some or all of the entities and concepts reflected in the data graph 200 may originate from data objects that are used or provided by existing application(s) that use, for example, one or more relational databases. Existing data objects and data relationships can be leveraged, by automatic creation of the data graph 200 from existing data sources. An application can use the data graph 200, for advanced querying, as previously described, without requiring an abandonment of traditional applications that use an existing data object infrastructure or a manual effort to create the data graph 200 from scratch. Applications can be crafted to use one or both types of data bases, depending on application needs.

Figure 3:
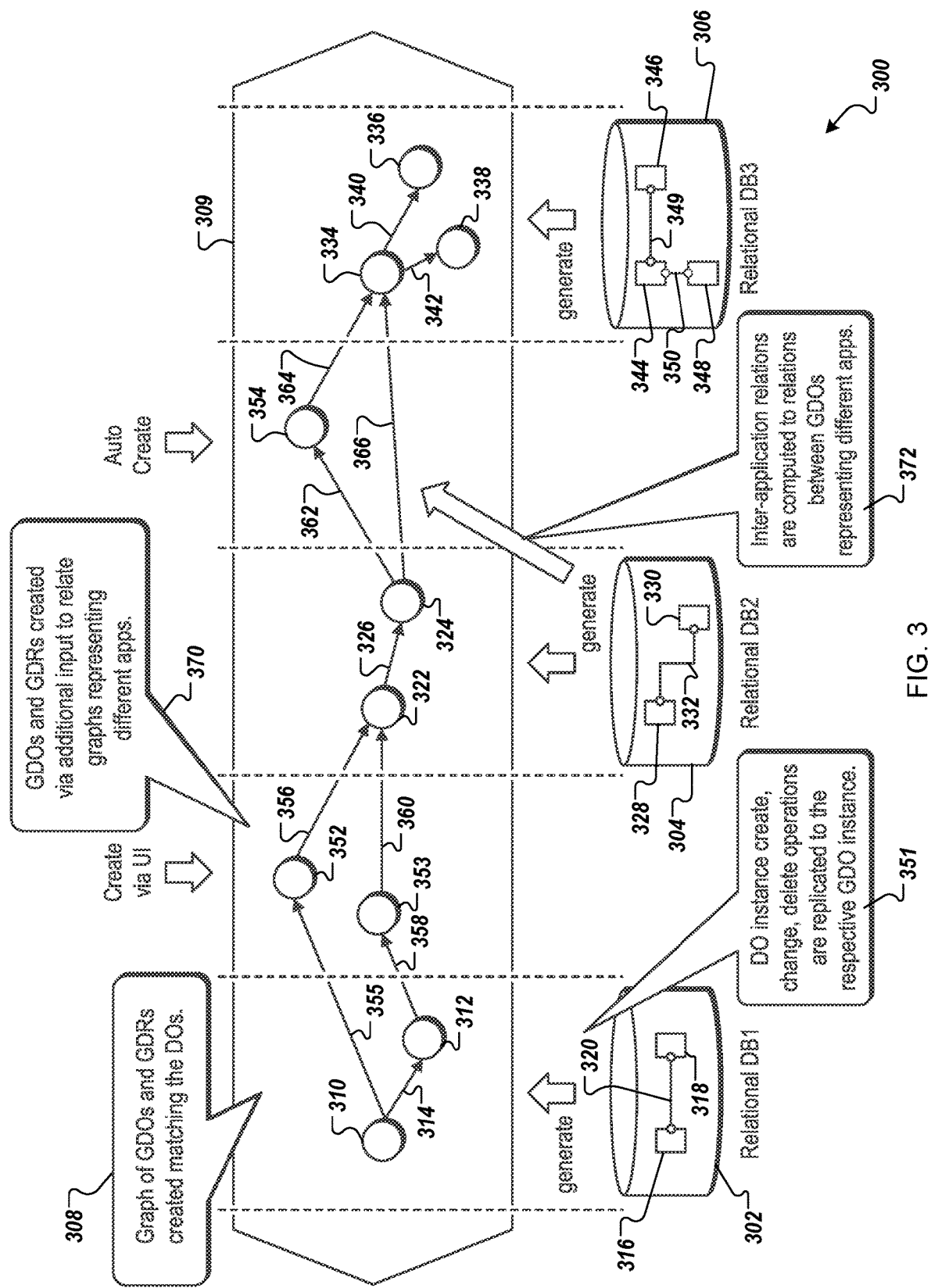
FIG. 3 is a block diagram illustrating an example of a system for creating a data graph from multiple relational databases, according to an implementation of the present disclosure.

FIG. 3 is a block diagram illustrating an example of a system 300 for creating a data graph from multiple relational databases, according to an implementation of the present disclosure. Data for different enterprise processes, systems, or applications can be stored in different databases. For example, data of an application built from microservices can be stored in a database that is separate from databases of other applications or services. For example, the system 300 includes a relational database 302, a relational database 304, and a relational database 306, for three different applications/services.

Multiple disparate databases generally do not allow for efficient running of cross domain analysis across the different databases. Related data cannot be easily followed from one application to another. While data analysis on a superset of data of different databases can be answered from a replicated data store such as a data warehouse or data lake, such secondary data stores are generally optimized for data aggregation, not for traversal of paths between associated objects. As an improved solution, realtime cross-domain queries can be efficiently processed using a data graph. The data graph can be created from multiple data sources and extended over time to hold information normally held in separate databases.

As mentioned by a note 308, a data graph 309 including GDOs and GDRs can be created from the DOs and associations in the relational databases 302, 304, and 306. For example, a GDO 310, a GDO 312, and a GDR 314 have been created based on a DO 316, a DO 318, and an association 320 included in the relational database 302, respectively. As another example, a GDO 322, a GDO 324, and a GDR 326 have been created based on a DO 328, a DO 330, and an association 332 included in the relational database 304, respectively. As yet another example, a GDO 334, a GDO 336, a GDO 338, a GDR 340, and a GDR 342 have been created based on a DO 344, a DO 346, a DO 348, an association 349, and an association 350 included in the relational database 306, respectively. As indicated by a note 351 (and described in more detail in further paragraphs), DO instance create, change, and delete operations can be replicated to a respective GDO instance.

After replication of DOs to GDOs, the data graph 309 includes data of different applications in one graph. The data graph 309 can be a global graph spanning multiple graphs representing objects from different applications. The data graph 309 can include representations of the application graphs and can also include additional vertices and additional edges that describe relationships between objects in the different applications. The system 300 can therefore enable relating and connecting otherwise non-connected graphs replicated from the different applications.

For instance, the data graph 309 can be extended by additional objects not created as replication DOs. For example, GDOs 352, 353, and 354 can be created in the data graph, as GDOs that are not replicated from the relational databases 302, 304, or 306. Additional created GDOs can be related to GDOs replicated from applications using GDRs. For example: the GDO 352 can be connected to the GDO 310 using a GDR 355 and to the GDO 322 using a GDR 356; the GDO 353 can be connected to the GDO 312 using a GDR 358 and to the GDO 322 using a GDR 360; and the GDO 354 can be connected to the GDO 324 using a GDR 362 and to the GDO 334 using a GDR 364. In some implementations, GDOs created from different applications can be linked directly using a GDR. For instance, the GDO 324 is connected to the GDO 334 using a GDR 366. The GDO 324 may represent a purchase order object and the GDO may represent a sales order object, for example, and the GDR 366 may reflect a linkage between a purchase order number and a sales order number (that may be reflected on documents exchanged between parties that have "our number/your number" information).

Additional GDOs can represent events that are raised by one application and consumed by one or more receiving applications. The additional GDO can include event information, including event metadata, such as retention time, information indicating whether event communication is synchronous or asynchronous, etc. The additional GDO can be a node that other objects from applications can subsequently connect to, with additional connections to the node representing other applications now consuming the event.

As indicated by a note 370, in some implementations and for some objects, additional GDOs or GDRs can be created in response to additional input from a user. For instance, a maintenance user interface can be used to create graph objects that have not been automatically created from replication. The GDO 352 and the GDO 353 can be created from user input, for example.

As another example and as indicated by a note 372, inter-application relationships can be automatically determined and reflected as relationships between GDOs representing different applications. For example, application integration information (for example, integration scenarios) can be evaluated, to determine application to application relationships. The GDO 354 can be automatically identified from integration information, for example. The GDO 354 can represent an intermediary object that is passed between two applications during an integration, for example. For instance, if the GDO 324 represents a purchase order and the GDO 334 represents a sales order, as previously described, the GDO 354 can represent purchase order information that is sent using electronic data exchange. The GDO 354 can have a separate identifier that can be referenced from both a purchase order object and a sales order object.

In general, automatic identification of inter-application relationships can be performed in a rule-based manner, for example to identify external references that may exist or be associated with a given application. For instance, semantically linked cross-application identifiers, at a semantic data object level, can be identified, even when such identifiers are not linked or included at a foreign key/relational database level. For instance, a purchase order object in a first system may include a reference to a sales order number that represents a sales order object in a different second system, and an inter-application relationship can be identified automatically, even when the relational database system of the first system does not store a sales order table or a foreign key relating to sales orders.

A GDO that links disparate systems can represent a logical external system that is used by or referred to a given source application or system. A GDO linking systems can represent a remote application instance, and can have attributes such as a Uniform Resource Locator (URL) of the remote system. As another example, a GDO linking systems can represent communication endpoints or destinations that are used by connected systems.

The data graph 309, once populated with replication and other types of objects, can enable operations and queries on data spanning different applications. For example, an application configured to use the relational database 304 can submit a query to the data graph 309 for objects related to the data object 330. The data graph 309 can identify and provide, as related objects, the graph data object 324, the graph data object 334, and by association, the data object 344 in the relational database 306. The data graph 309 can be constructed more easily and with less impact on existing applications and databases, as compared to custom development in respective applications that may have to occur to reflect, in traditional systems, inter-application relationships, for example. Custom, in-application development may be time consuming and may not be reusable in other contexts.

Figure 4:
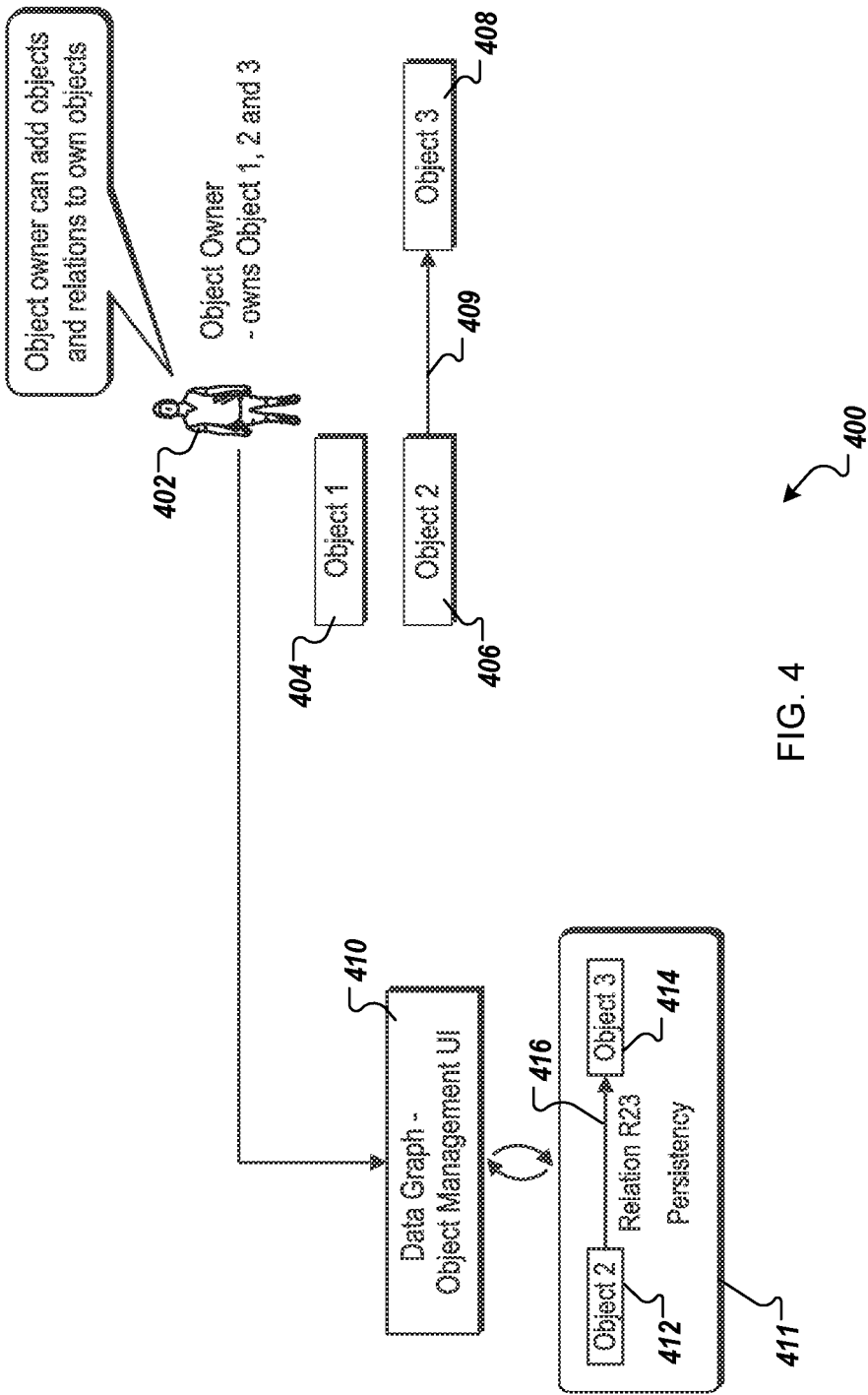
FIG. 4 is a block diagram of an example of a system for using an object management user interface, according to an implementation of the present disclosure.

FIG. 4 is a block diagram of an example of a system 400 for using an object management user interface, according to an implementation of the present disclosure. Although data graph objects can be created automatically, as mentioned, from data objects, data graph objects can also be created manually by an object owner, or can be created or modified automatically but conditionally, based on data object owner consent.

An object (or object type) owner 402 (for example, a developer), can own a first data object 404, a second data object 406, and a third data object 408. The second data object 406 is linked to the third data object 408 using an association 409. The object owner 402 can use a data graph object management user interface 410 to create, in a data graph persistency 411, a GDO 412 corresponding to the second data object 406, a GDO 414 corresponding to the third data object 408, and a GDR 416 corresponding to the association 409. The object owner 402 can choose to create or not create a GDO for the first data object 404, for example.

As another example, the object owner 402 can use the object management user interface 410 to configure consent for data graph support for some or all of the data objects owned by the object owner 402. Data graph support can include providing (or restricting) consent for keeping data objects and corresponding data graph objects in sync, for example. Consent information can be stored in the data graph persistency 411. A data graph can be extended by additional attributes that can define creation and modification processes, regarding which data may be stored upon Create, Update, Delete (CUD) operations and which relations and attributes can be read by different business processes.

Figure 5:
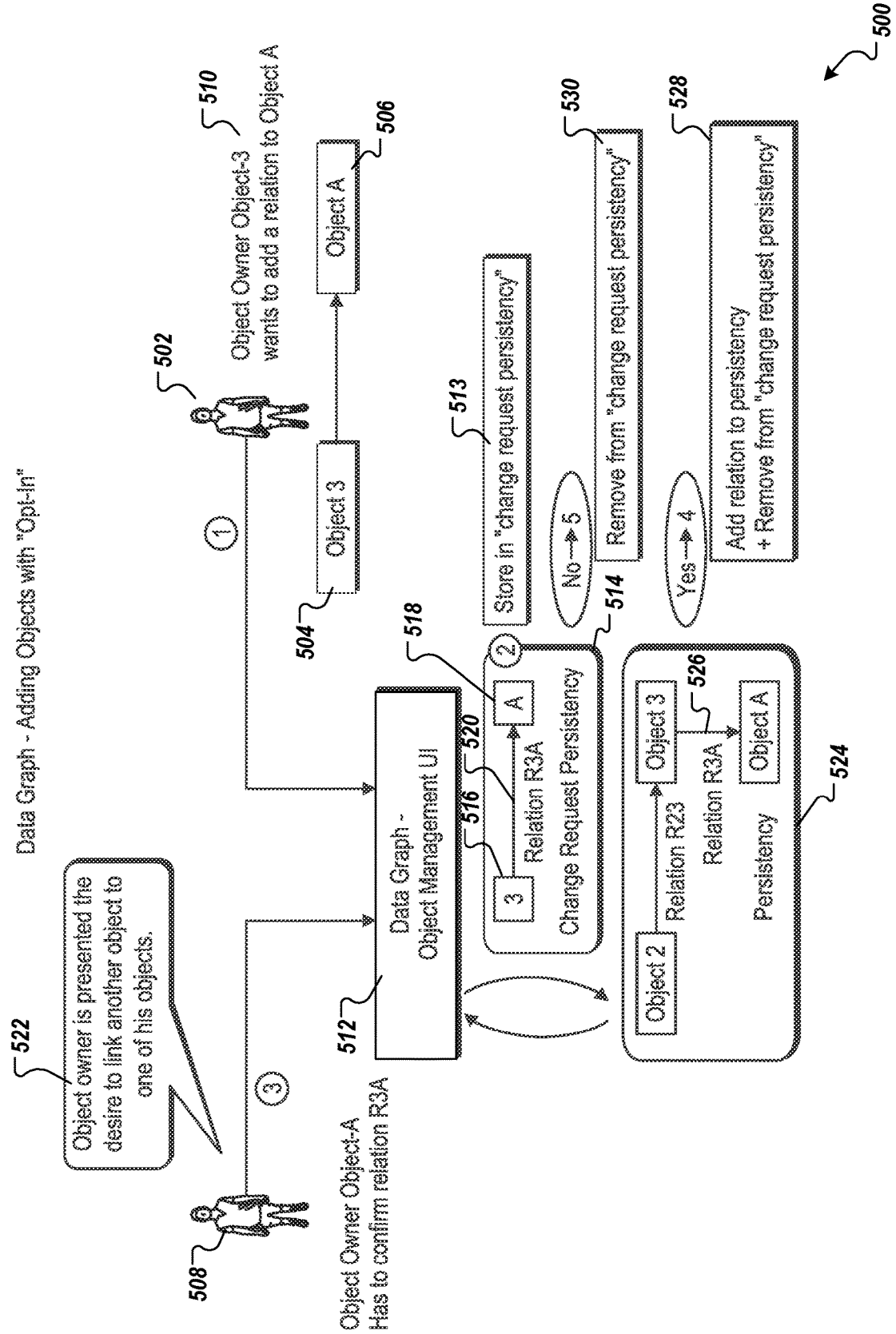
FIG. 5 is a block diagram of an example of a system for obtaining consent to link graph data objects, according to an implementation of the present disclosure.

FIG. 5 is a block diagram of an example of a system 500 for obtaining consent to link graph data objects, according to an implementation of the present disclosure. A first object owner 502 owns a data object 504 that is related to a data object 506 owned by a second object owner 508. As indicated by a note 510, the first object owner 502 wants to add (or to have added), in a data graph, a GDR that connects GDOs corresponding to the data object 504 and the data object 506.

In a first stage (represented by a circled "one"), the first object owner 502 sends a request to a data graph object management user interface 512, for connecting GDOs corresponding to the data object 504 and the data object 506. As indicated by a note 513, the request can be stored, in a second stage, in a change request persistency 514, and can be for connecting a GDO 516 corresponding to the data object 504 with a GDO 518 corresponding to the data object 506, using a GDR 520. In a third stage and as illustrated in a note 522, the second object owner 508 is presented with an approval request for approving the request sent by the first object owner 502.

In a fourth stage that represents an approval from the second object owner 508, the requested link is stored in a data graph persistency 524 as a GDR 526. As indicated by a note 528, the request from the first object owner 502 is removed from the change request persistency after the GDR 526 is established in the data graph persistency 524. As indicated by a note 530, in a fifth stage that represents a rejection from the second object owner 508, the request from the first object owner 502 is removed from the change request persistency 514, in response to the rejection.

Accordingly, relations in a knowledge graph may depend on consent of an object provider/owner. Consent approval can provide a solution for a fact that not all relations should necessarily be allowed to be created (or desired by an application designer). Legal, policy, or privacy considerations (for example, as specified by General Data Protection Regulation (GDPR)) may result in consent configurations that prevent certain relationships or objects from being completely or fully replicated into or linked to other objects in a data graph.

Figure 6:
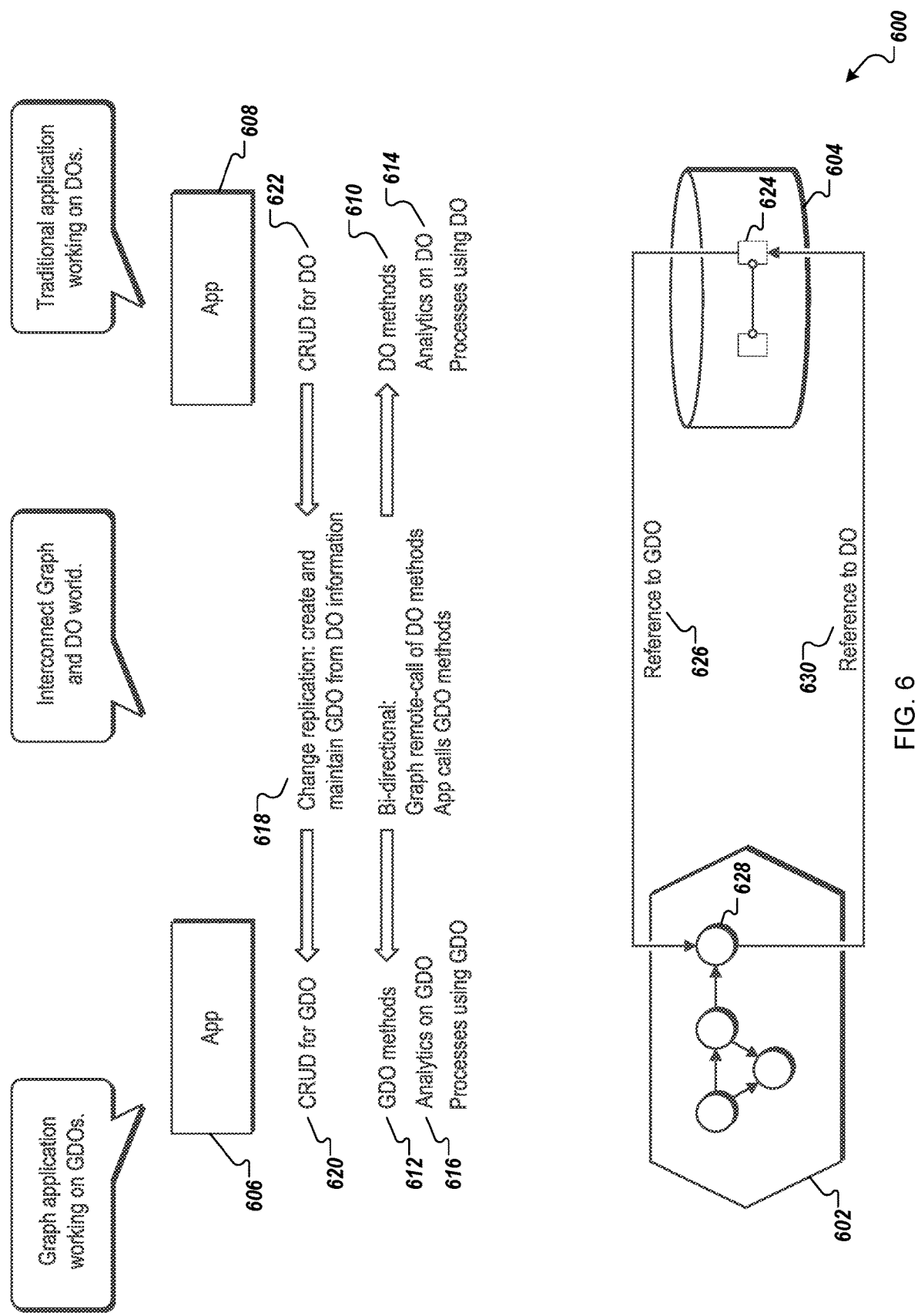
FIG. 6 is a block diagram of an example of a system for synchronizing a data graph, according to an implementation of the present disclosure.

FIG. 6 is a block diagram of an example of a system 600 for synchronizing a data graph, according to an implementation of the present disclosure. After automatic creation of a data graph 602 from at least one relational database such as a relational database 604, the data graph 602 can include a mirror representation of data objects from the relational database(s). Accordingly, applications can be developed to use either the graph database 602 or the relational database 604, or switch between the graph database 602 and the relational database 604 according to application needs.

New or existing applications can be integrated into an EKG environment using the data graph 602. For example, a new graph application 606 can be configured to use the data graph 602. As another example, an existing traditional application 608 can continue to use the relational database 604 and can also be modified to use some features of the data graph 602.

Any suitable application can use the graph database 602 or the relational database 604. An application can use data object methods 610 or GDO/GDR methods 612, to act on data objects or graph objects, respectively. Modify operations by applications to the data graph 602 can be limited to a method layer that includes graph methods and respective GDO and GDR methods, to ensure consistency of the data graph 602. Additionally, applications can perform data object analytics 614 or graph object analytics 616.

The system 600 can be configured to keep the data graph 602 and the relational database 604 synchronized when either graph or data object instances are modified. Using a change replication framework 618, changes made to data object instances can be replicated to corresponding GDOs to keep the data objects and the GDOs synchronized. Otherwise, the data graph 602 and the relational database 604 could become unsynchronized. Create, Read, Update, and Delete (CRUD) operations 620 and 622 can be configured, in the graph and relational worlds, for synchronization, respectively. A data object and a corresponding GDO can be bi-directionally linked, to support synchronization. For example, a data object 624 can include a reference 626 to a corresponding GDO 628 and the GDO 628 can include a reference 630 to the data object 624.

Consistency operations can include performing two types of operations, including first operation(s) on the relational database 604 and second operation(s) on the graph database 602. Error handling can include handling a failure of either a first or second operation. For example, transactional support can be included, such as rolling back a first operation if a second operation fails. As another example, requests can be stored in an update queue, and if a particular update fails, an operator can be notified to examine the update in the update queue and resolve the failure.

Figure 7:
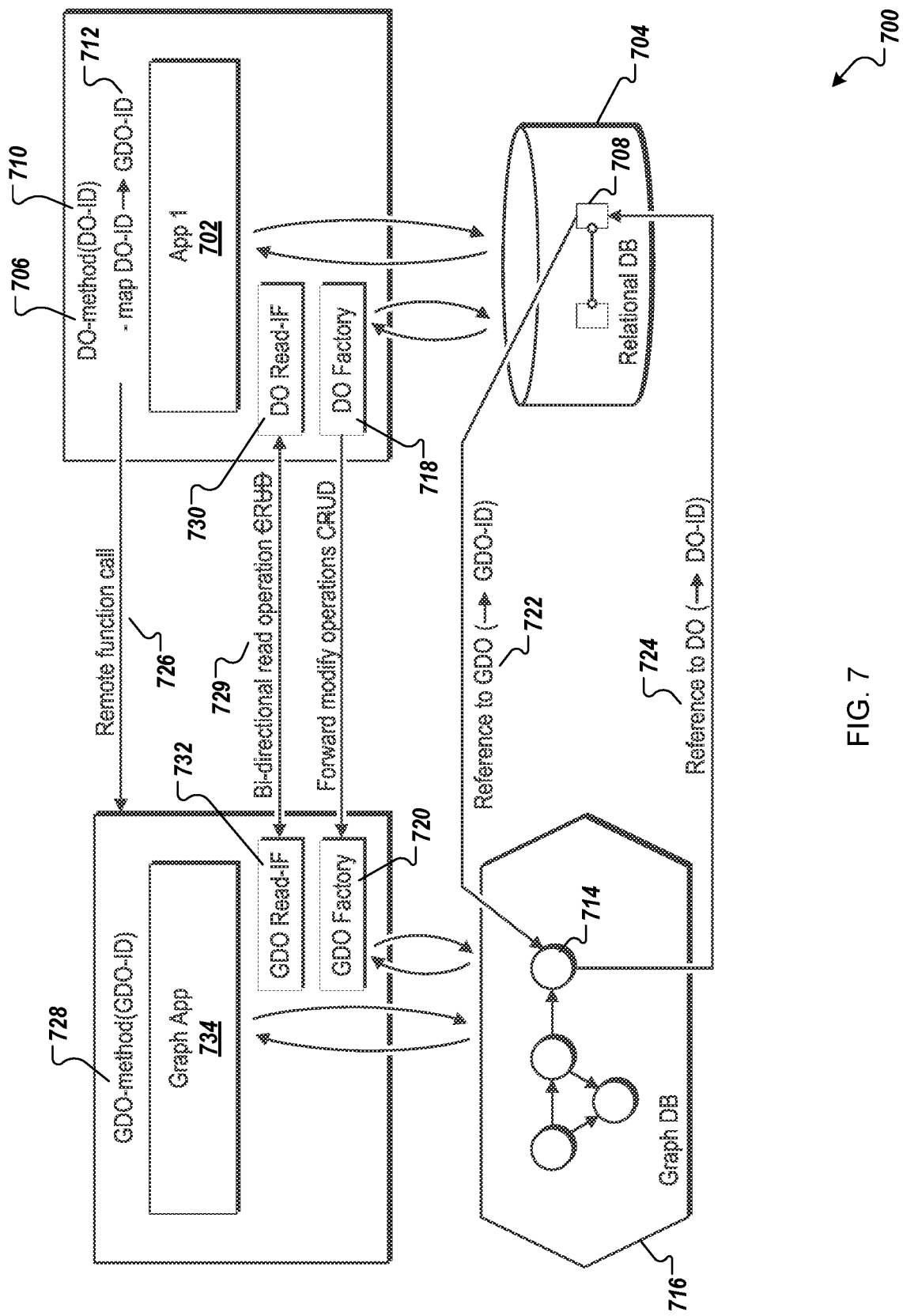
FIG. 7 is a block diagram of an example of a system for coordinating data object and graph object methods, according to an implementation of the present disclosure.

FIG. 7 is a block diagram of an example of a system 700 for coordinating data object and graph object methods, according to an implementation of the present disclosure. An application 702 that uses a relational database 704 can, during processing, invoke a method 706 on a data object 708 (for example, having an object identifier 710). The object identifier 710 may have been mapped to a GDO identifier 712 of a corresponding GDO 714 stored in a graph database 716, for example. A DO factory 718 may have provided the object identifier 710 to a GDO factory 720, for example. The GDO factory 720, in turn, can provide the GDO identifier 712 to the DO factory 718. Accordingly, the data object 708 can have a reference 722 to the GDO 714 and the GDO 714 can have a reference 724 to the data object 708.

If the method 706 results in a modification (for example, an update to or a deletion of) the data object 708, the DO factory 718 can forward modify operation requests to the GDO factory 720, so that the GDO factory 720 can modify the corresponding GDO 714. Forwarding the modify operation request can include using a remote function call 726 to invoke a GDO method 728 that corresponds to the method 706.

Bi-directional read operations 729 can be supported, using a data object read interface 730 and a GDO read interface 732, that enable the application 702 to read graph object information and a graph application 734 to read data object information, respectively. In some implementations, the GDO read interface 732 uses optimized graph operations and algorithms to perform operations directly on a graph. Various graph query languages can be supported. Graph vertices and edges can have identifiers that map to corresponding GDO or GDR instances, respectively. A graph read operation that results in a set of vertices and edges can be mapped to a set of GDO and GDR instances.

Figure 8:
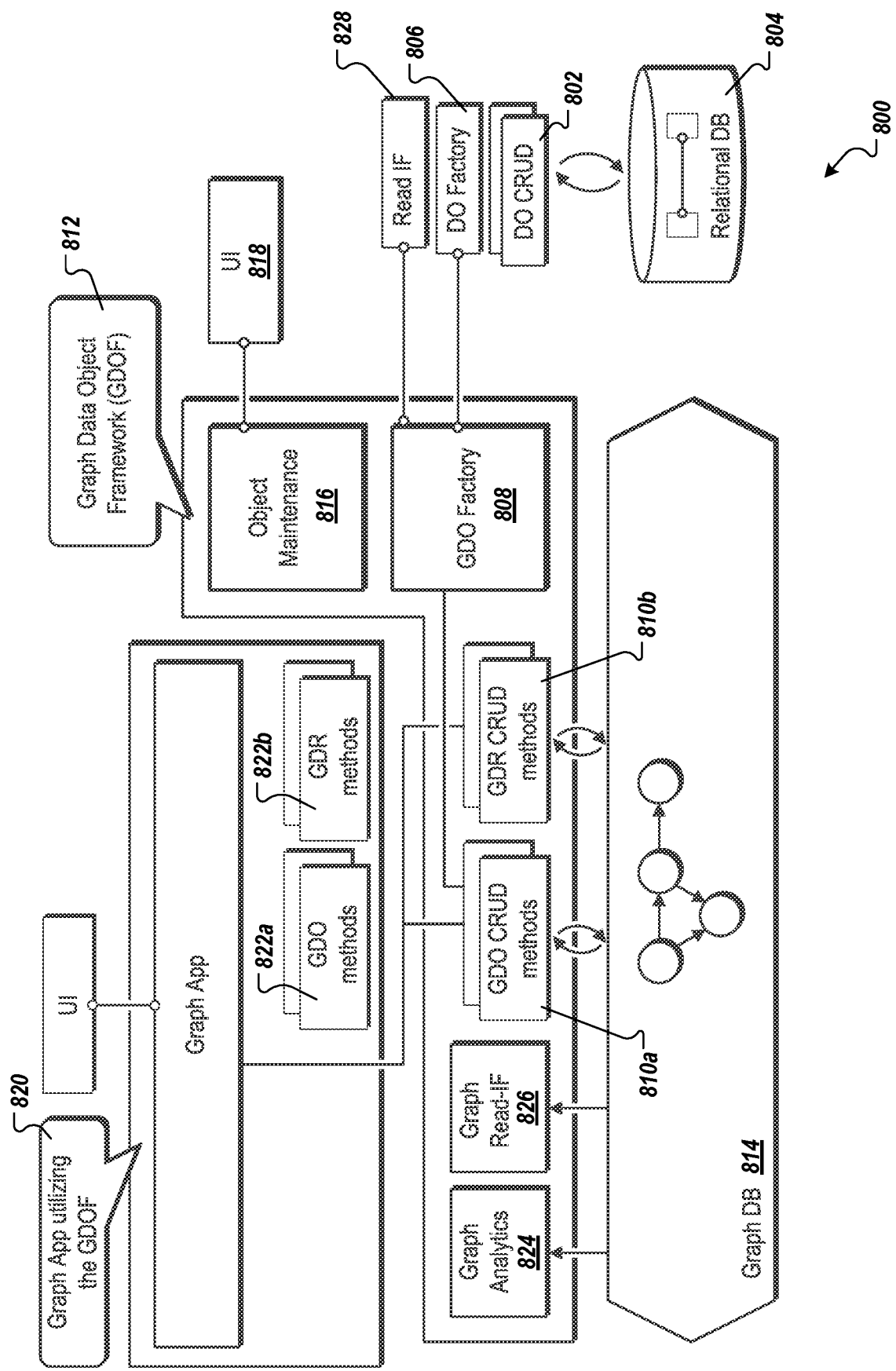
FIG. 8 is a block diagram of an example of a system for automatic creation and synchronization of graph database objects, according to an implementation of the present disclosure.

FIG. 8 is a block diagram of an example of a system 800 for automatic creation and synchronization of graph database objects, according to an implementation of the present disclosure. Data object CRUD operations 802 on data objects in a relational database 804 can result in a DO factory 806 triggering a GDO factory 808 to invoke corresponding GDO and GDR CRUD application method(s) 810*a* or 810*b*, respectively, in a GDO framework 812 to make corresponding changes to corresponding GDOs in a graph database 814.

During replication, the GDO factory 808 can create a related GDO for an existing DO. The DO factory 806 can pass a DO instance to the GDO factory 808. The GDO factory 808 can read a DO identifier, a DO type, DO attributes, and DO associations of the DO instance. The GDO factory 808 can create a GDO instance as a vertex of a graph with a new GDO identifier for the instance, add a DO identifier property to the GDO instance that links the GDO instance to the DO instance, add other properties to the GDO instance based on attributes read from the DO instance, and send an update request to the DO factory 802 to add an attribute to the DO instance with the value of the GDO identifier, to link the DO instance to the GDO instance.

The GDO factory 808 can iterate through the associations of the DO instance to establish relationships for the GDO instance. For each association, the GDO factory 808 can identify, using the association, a related DO instance related to the original DO instance, extract an identifier of the related DO instance, determine whether a GDO instance exists that is linked to the related DO instance, create a related GDO instance for the related DO instance if no GDO instance had already been created for the related DO instance, create a GDR relating the related GDO instance to the GDO mapped to the original DO instance, and add attributes to the GDR based on attributes of the DO association.

The GDO framework 808 includes an object maintenance component 816 that can be used for creating non-replication GDOs (for example, using a provided user interface 818). A GDO type and GDO property values can be provided to the GDO factory 808, for creation of a new GDO. The GDO factory 808 can create a new GDO instance as a vertex of the graph, establish a GDO identifier for the new GDO instance, and add properties to the new GDO instance based on the provided property values.

A graph application 820 can include GDO and GDR method calls 822*a* or 822*b*, respectively, that, when called, result in execution of GDO and GDR CRUD application methods 810*a* or 810*b*, respectively. The graph application 820 can also invoke GDR method(s) or graph-level methods applicable to the graph itself. An overall set of GDO, GDR, and graph methods provided by the GDO framework 812 can be an API for the graph application 820 that when used can result in consistency both within the graph database 814 and the consistency of the graph database 814 with the relational database 804 (and other associated databases). The API provided by the GDO framework 812 can ensure other types of consistency, such as ensuring that requested operations follow a state-model and only allow defined state transitions.

The graph application 820 can use a graph analytics engine 824 or a graph read interface 826 for graph read operations that execute path traversal, path analytics and other read-path algorithms. Example queries can include: querying whether two GDO instances are related, either directly or from a path that has intermediary object(s); querying for a list of GDOs that are related to an input GDO, with an optional depth constraint; querying for GDOs or GDRs by name or identifier; or other types of queries. A read-operation on a GDO instance can retrieve a corresponding DO identifier and read data of the related DO. Similarly, a read operation on a DO performed using a DO read interface 828 can retrieve a related GDO instance identifier and read data of the related GDO.

If a DO instance is deleted, the GDO-factory 808 can be invoked to make the graph database 814 consistent with the DO instance deletion. Simple deletion of a related GDO instance can lead to an inconsistent graph, as there may be edges going to or from the GDO instance. Accordingly, to consistently delete a related GDO instance, the GDO factory can first delete all edges going to and from the GDO instance. Other approaches can be used. For instance, the GDO framework 812 can respond with an error message to the DO factory to a deletion request if a related GDO instance to be deleted is connected to other items in the graph.

Figure 9:
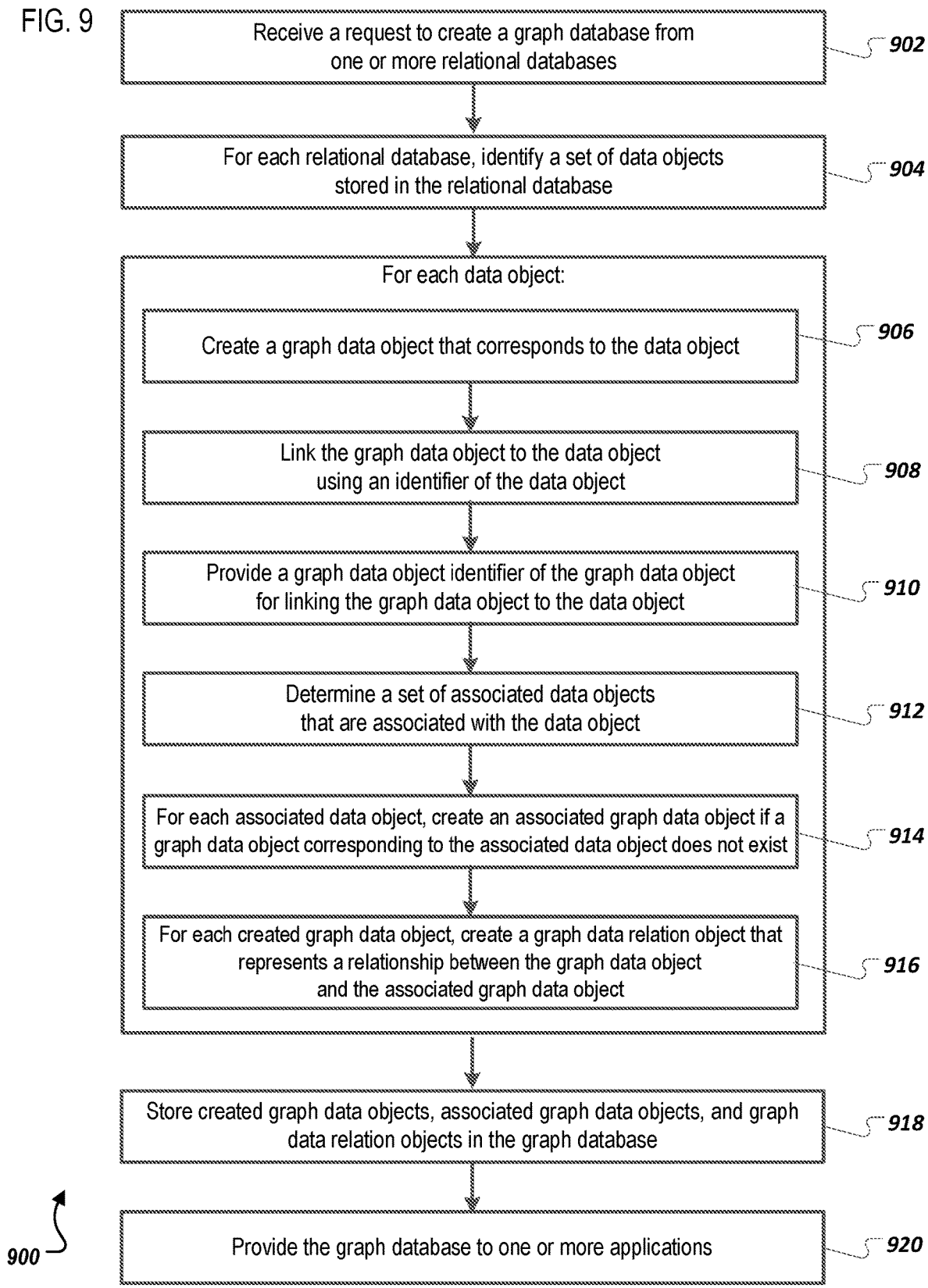
FIG. 9 is a flowchart illustrating an example of a computer-implemented method for automatic creation and synchronization of graph database objects, according to an implementation of the present disclosure.

FIG. 9 is a flowchart illustrating an example of a computer-implemented method 900 for automatic creation and synchronization of graph database objects, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a request is received to create a graph database from one or more relational databases. From 902, method 900 proceeds to 904.

At 904, for each relational database, a set of data objects stored in the relational database is identified. For each identified data object stored in the relational database, a set of processing steps is performed. From 904, method 900 proceeds to 906.

At 906, a graph data object is created that corresponds to the data object. From 906, method 900 proceeds to 908.

At 908, the graph data object is linked to the data object using an identifier of the data object. Additionally, one or more properties can be added to the graph data object based on a set of attributes read from the data object. From 908, method 900 proceeds to 910.

At 910, a graph data object identifier of the graph data object is provided for linking the graph data object to the data object. The graph data object identifier can be provided to a data object factory that maintains data objects in the relational database. From 910, method 900 proceeds to 912.

At 912, a set of zero or more associated data objects that are associated with the data object is determined. From 912, method 900 proceeds to 914.

At 914, if at least one associated data object has been determined, for each associated data object, an associated graph data object is created if a graph data object corresponding to the associated data object does not exist. A graph data object may have already been created due to a previously processed association, for example. From 914, method 900 proceeds to 916.

At 916, for each created graph data object, a graph data relation object is created that represents a relationship between the graph data object and the associated graph data object. From 916, method 900 proceeds to 918.

At 918, created graph data objects, associated graph data objects, and graph data relation objects are stored in the graph database. From 918, method 900 proceeds to 920.

At 920, the graph database is provided to one or more applications. The one or more applications can query the graph database. After 920, method 900 stops.

After the graph database has been created, a change to a first data object in a first relational database can be determined. A first graph data object corresponding to the first data object can be identified and the first graph data object can be updated based on the change in the first data object. As another example, a change to a first graph data object can be detected in the graph database, for example based on an update from an application. A first data object corresponding to the first graph data object can be identified and information for the first change can be provided, for example to the data object factory, for updating of the first data object.

In some implementations, the one or more relational databases include a first database for a first application and a second database for a second application. One or more inter-application relationships between the first application and the second application can be identified that are not represented as a foreign key in the first database or the second database. For each inter-application relationship, a first graph data object created from the first database can be linked with a second graph data object created from the second database, using either a graph data relation object or an intermediary graph data object. Providing the graph database to one or more applications can include enabling the one or more applications to query for inter-application relationships.

Figure 10:
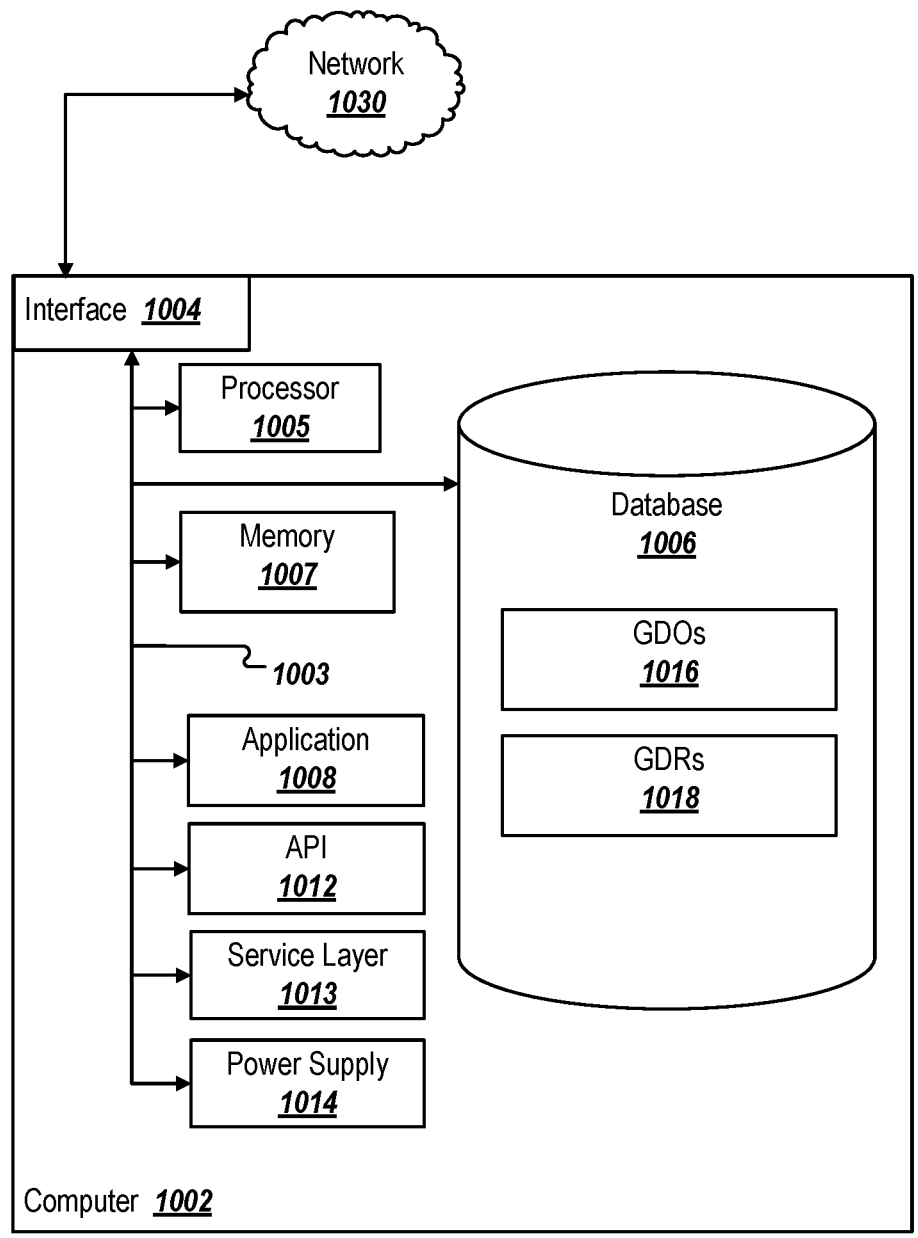
FIG. 10 is a block diagram illustrating an example of a computer-implemented system used to provide computational functionalities associated with described algorithms, methods, functions, processes, flows, and procedures, according to an implementation of the present disclosure.

FIG. 10 is a block diagram illustrating an example of a computer-implemented System 1000 used to provide computational functionalities associated with described algorithms, methods, functions, processes, flows, and procedures, according to an implementation of the present disclosure. In the illustrated implementation, System 1000 includes a Computer 1002 and a Network 1030.

The illustrated Computer 1002 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 1002 can include an input device, such as a keypad, keyboard, or touch screen, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as, for example, a client, network component, a server, or a database or another persistency, or a combination of roles for performing the subject matter described in the present disclosure. The illustrated Computer 1002 is communicably coupled with a Network 1030. In some implementations, one or more components of the Computer 1002 can be configured to operate within an environment, or a combination of environments, including cloud-computing, local, or global.

At a high level, the Computer 1002 is an electronic computing device operable to receive, transmit, process, store, or manage data and information associated with the described subject matter. According to some implementations, the Computer 1002 can also include or be communicably coupled with a server, such as an application server, e-mail server, web server, caching server, or streaming data server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 1003. In some implementations, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 1002, alternative implementations can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular implementations of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular implementations of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory or conventional database storing data consistent with the present disclosure. In some implementations, Database 1006 can be a combination of two or more different database types (for example, a hybrid in-memory and conventional database) according to particular needs, desires, or particular implementations of the Computer 1002 and the described functionality. Although illustrated as a single Database 1006, two or more databases of similar or differing types can be used according to particular needs, desires, or particular implementations of the Computer 1002 and the described functionality. While Database 1006 is illustrated as an integral component of the Computer 1002, in alternative implementations, Database 1006 can be external to the Computer 1002. As illustrated, the Database 1006 holds the previously described GDOs 1016 and GDRs 1018.

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some implementations, Memory 1007 can be a combination of two or more different types of memory (for example, a combination of semiconductor and magnetic storage) according to particular needs, desires, or particular implementations of the Computer 1002 and the described functionality. Although illustrated as a single Memory 1007, two or more Memories 1007 or similar or differing types can be used according to particular needs, desires, or particular implementations of the Computer 1002 and the described functionality. While Memory 1007 is illustrated as an integral component of the Computer 1002, in alternative implementations, Memory 1007 can be external to the Computer 1002.

The Application 1008 is an algorithmic software engine providing functionality according to particular needs, desires, or particular implementations of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative implementations, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some implementations, the Power Supply 1014 can include power-conversion or management circuits (including recharging, standby, or another power management functionality). In some implementations, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

Described implementations of the subject matter can include one or more features, alone or in combination.

For example, in a first implementation, a computer-implemented method, comprising: receiving a request to create a graph database from one or more relational databases; for each relational database: identify a set of data objects stored in the relational database; and for each data object stored in the relational database: create a graph data object that corresponds to the data object; link the graph data object to the data object using an identifier of the data object; provide a graph data object identifier of the graph data object for linking the graph data object to the data object; determine a set of associated data objects that are associated with the data object; for each associated data object, create an associated graph data object if a graph data object corresponding to the associated data object does not exist; and for each created graph data object, create a graph data relation object that represents a relationship between the graph data object and the associated graph data object; storing created graph data objects, associated graph data objects, and graph data relation objects in the graph database; and providing the graph database to one or more applications.

The foregoing and other described implementations can each, optionally, include one or more of the following features:

A first feature, combinable with any of the following features, comprising adding one or more properties to the graph data object based on a set of attributes read from the data object.

A second feature, combinable with any of the previous or following features, wherein the one or more relational databases include a first database for a first application and a second database for a second application, and wherein the computer-implemented method further comprises: identifying one or more inter-application relationships between the first application and the second application that are not represented as a foreign key in the first database or the second database; and for each inter-application relationship, linking, in the graph database, a first graph data object created from the first database with a second graph data object created from the second database.

A third feature, combinable with any of the previous or following features, wherein the first graph data object and the second graph data object are linked with a linking graph data relation object.

A fourth feature, combinable with any of the previous or following features, wherein the first graph data object and the second graph data object are linked with an intermediary graph data object.

A fifth feature, combinable with any of the previous or following features, wherein providing the graph database to one or more applications comprises enabling the one or more applications to query for inter-application relationships.

A sixth feature, combinable with any of the previous or following features, further comprising: determining a first change to a first data object in a first relational database; identifying a first graph data object corresponding to the first data object; and updating the first graph data object based on the first change in the first data object.

A seventh feature, combinable with any of the previous or following features, further comprising: determining a first change to a first graph data object in the graph database; identifying a first data object corresponding to the first graph data object; and providing information for the first change for updating of the first data object.

An eighth feature, combinable with any of the previous or following features, wherein a first relational database includes data objects of a first type used by a first application, a second relational database includes data objects of a second type used by a second application, and the graph database includes a first graph data relation object that links a first data object of the first type to a second data object of the second type, and wherein the computer-implemented method further comprises: receiving a query from the first application for objects that are related to the first data object; determining, based on identifying the first graph data relation object, that the second data object of the second type is related to the first data object; and providing, in response to the query, at least an identifier of the second data object, to the first application, to enable the first application to interact with the second data object.

A ninth feature, combinable with any of the previous or following features, comprising: identifying a new relationship between a first data object and a second data object initiated by a first owner of the first data object; identifying a second owner of the second data object; sending an approval request to the second owner for linking, in the graph database, a first graph data object corresponding to the first data object to a second graph data object corresponding to the second data object; receiving an approval from the second owner in response to the approval request; and linking, in the graph database, the first graph data object to the second graph data object, based on the approval and the new relationship.

In a second implementation, a non-transitory, computer-readable medium storing one or more instructions executable by a computer system to perform operations comprising: receiving a request to create a graph database from one or more relational databases; for each relational database: identify a set of data objects stored in the relational database; and for each data object stored in the relational database: create a graph data object that corresponds to the data object; link the graph data object to the data object using an identifier of the data object; provide a graph data object identifier of the graph data object for linking the graph data object to the data object; determine a set of associated data objects that are associated with the data object; for each associated data object, create an associated graph data object if a graph data object corresponding to the associated data object does not exist; and for each created graph data object, create a graph data relation object that represents a relationship between the graph data object and the associated graph data object; storing created graph data objects, associated graph data objects, and graph data relation objects in the graph database; and providing the graph database to one or more applications.

The foregoing and other described implementations can each, optionally, include one or more of the following features:

A first feature, combinable with any of the following features, wherein the operations comprise adding one or more properties to the graph data object based on a set of attributes read from the data object.

A second feature, combinable with any of the previous or following features, wherein the one or more relational databases include a first database for a first application and a second database for a second application, and wherein the operations comprise: identifying one or more inter-application relationships between the first application and the second application that are not represented as a foreign key in the first database or the second database; and for each inter-application relationship, linking, in the graph database, a first graph data object created from the first database with a second graph data object created from the second database.

A third feature, combinable with any of the previous or following features, wherein the first graph data object and the second graph data object are linked with a linking graph data relation object.

A fourth feature, combinable with any of the previous or following features, wherein the first graph data object and the second graph data object are linked with an intermediary graph data object.

A fifth feature, combinable with any of the previous or following features, wherein providing the graph database to one or more applications comprises enabling the one or more applications to query for inter-application relationships.

A sixth feature, combinable with any of the previous or following features, wherein the operations further comprise: determining a first change to a first data object in a first relational database; identifying a first graph data object corresponding to the first data object; and updating the first graph data object based on the first change in the first data object.

A seventh feature, combinable with any of the previous or following features, wherein the operations further comprise: determining a first change to a first graph data object in the graph database; identifying a first data object corresponding to the first graph data object; and providing information for the first change for updating of the first data object.

An eighth feature, combinable with any of the previous or following features, wherein a first relational database includes data objects of a first type used by a first application, a second relational database includes data objects of a second type used by a second application, and the graph database includes a first graph data relation object that links a first data object of the first type to a second data object of the second type, and wherein the operations further comprise: receiving a query from the first application for objects that are related to the first data object; determining, based on identifying the first graph data relation object, that the second data object of the second type is related to the first data object; and providing, in response to the query, at least an identifier of the second data object, to the first application, to enable the first application to interact with the second data object.

A ninth feature, combinable with any of the previous or following features, wherein the operations comprise: identifying a new relationship between a first data object and a second data object initiated by a first owner of the first data object; identifying a second owner of the second data object; sending an approval request to the second owner for linking, in the graph database, a first graph data object corresponding to the first data object to a second graph data object corresponding to the second data object; receiving an approval from the second owner in response to the approval request; and linking, in the graph database, the first graph data object to the second graph data object, based on the approval and the new relationship.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a request to create a graph database from one or more relational databases; for each relational database: identify a set of data objects stored in the relational database; and for each data object stored in the relational database: create a graph data object that corresponds to the data object; link the graph data object to the data object using an identifier of the data object; provide a graph data object identifier of the graph data object for linking the graph data object to the data object; determine a set of associated data objects that are associated with the data object; for each associated data object, create an associated graph data object if a graph data object corresponding to the associated data object does not exist; and for each created graph data object, create a graph data relation object that represents a relationship between the graph data object and the associated graph data object; storing created graph data objects, associated graph data objects, and graph data relation objects in the graph database; and providing the graph database to one or more applications.

The foregoing and other described implementations can each, optionally, include one or more of the following features:

A first feature, combinable with any of the following features, wherein the operations comprise adding one or more properties to the graph data object based on a set of attributes read from the data object.

A second feature, combinable with any of the previous or following features, wherein the one or more relational databases include a first database for a first application and a second database for a second application, and wherein the operations comprise: identifying one or more inter-application relationships between the first application and the second application that are not represented as a foreign key in the first database or the second database; and for each inter-application relationship, linking, in the graph database, a first graph data object created from the first database with a second graph data object created from the second database.

A third feature, combinable with any of the previous or following features, wherein the first graph data object and the second graph data object are linked with a linking graph data relation object.

A fourth feature, combinable with any of the previous or following features, wherein the first graph data object and the second graph data object are linked with an intermediary graph data object.

A fifth feature, combinable with any of the previous or following features, wherein providing the graph database to one or more applications comprises enabling the one or more applications to query for inter-application relationships.

A sixth feature, combinable with any of the previous or following features, wherein the operations further comprise: determining a first change to a first data object in a first relational database; identifying a first graph data object corresponding to the first data object; and updating the first graph data object based on the first change in the first data object.

A seventh feature, combinable with any of the previous or following features, wherein the operations further comprise: determining a first change to a first graph data object in the graph database; identifying a first data object corresponding to the first graph data object; and providing information for the first change for updating of the first data object.

An eighth feature, combinable with any of the previous or following features, wherein a first relational database includes data objects of a first type used by a first application, a second relational database includes data objects of a second type used by a second application, and the graph database includes a first graph data relation object that links a first data object of the first type to a second data object of the second type, and wherein the operations further comprise: receiving a query from the first application for objects that are related to the first data object; determining, based on identifying the first graph data relation object, that the second data object of the second type is related to the first data object; and providing, in response to the query, at least an identifier of the second data object, to the first application, to enable the first application to interact with the second data object.

A ninth feature, combinable with any of the previous or following features, wherein the operations comprise: identifying a new relationship between a first data object and a second data object initiated by a first owner of the first data object; identifying a second owner of the second data object; sending an approval request to the second owner for linking, in the graph database, a first graph data object corresponding to the first data object to a second graph data object corresponding to the second data object; receiving an approval from the second owner in response to the approval request; and linking, in the graph database, the first graph data object to the second graph data object, based on the approval and the new relationship.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving a request to create a graph database from one or more relational databases;
   for each relational database:
     identify a set of data objects stored in the relational database; and
     for each data object in the set of data objects stored in the relational database:
       create a graph data object that corresponds to the data object;
       link the graph data object to the data object using an identifier of the data object;
       provide a graph data object identifier of the graph data object for linking the graph data object to the data object;
       determine a set of associated data objects that are associated with the data object;
       for each associated data object, create an associated graph data object if a graph data object corresponding to the associated data object does not exist; and
       for each created graph data object, create a graph data relation object that represents a relationship between the graph data object and the associated graph data object;
   storing created graph data objects, associated graph data objects, and graph data relation objects in the graph database;
   providing the graph database to one or more applications;
   identifying a new relationship between a first data object and a second data object initiated by a first owner of the first data object;
   identifying a second owner of the second data object;
   sending an approval request to the second owner for linking, in the graph database, a first graph data object corresponding to the first data object to a second graph data object corresponding to the second data object;
   receiving an approval from the second owner in response to the approval request; and
   linking, in the graph database, the first graph data object to the second graph data object, based on the approval and the new relationship.

2. The computer-implemented method of claim 1, comprising adding one or more properties to the graph data object based on a set of attributes read from the data object.

3. The computer-implemented method of claim 1, wherein the one or more relational databases include a first database for a first application and a second database for a second application, and wherein the computer-implemented method further comprises:
   identifying one or more inter-application relationships between the first application and the second application that are not represented as a foreign key in the first database or the second database; and
   for each inter-application relationship, linking, in the graph database, a first graph data object created from the first database with a second graph data object created from the second database.

4. The computer-implemented method of claim 3, wherein the first graph data object and the second graph data object are linked with a linking graph data relation object.

5. The computer-implemented method of claim 3, wherein the first graph data object and the second graph data object are linked with an intermediary graph data object.

6. The computer-implemented method of claim 3, wherein providing the graph database to one or more applications comprises:
   enabling the one or more applications to query for inter-application relationships.

7. The computer-implemented method of claim 1, further comprising:
   determining a first change to a first data object in a first relational database;
   identifying a first graph data object corresponding to the first data object; and
   updating the first graph data object based on the first change in the first data object.

8. The computer-implemented method of claim 1, further comprising:
   determining a first change to a first graph data object in the graph database;
   identifying a first data object corresponding to the first graph data object; and
   providing information for the first change for updating of the first data object.

9. The computer-implemented method of claim 1, wherein a first relational database includes data objects of a first type used by a first application, a second relational database includes data objects of a second type used by a second application, and the graph database includes a first graph data relation object that links a first data object of the first type to a second data object of the second type, and wherein the computer-implemented method further comprises:
   receiving a query from the first application for objects that are related to the first data object;
   determining, based on identifying the first graph data relation object, that the second data object of the second type is related to the first data object; and
   providing, in response to the query, at least an identifier of the second data object, to the first application, to enable the first application to interact with the second data object.

10. A non-transitory, computer-readable medium storing one or more instructions executable by a computer system to perform operations comprising:
    receiving a request to create a graph database from one or more relational databases;
    for each relational database:
      identify a set of data objects stored in the relational database; and
      for each data object in the set of data objects stored in the relational database:
        create a graph data object that corresponds to the data object;
        link the graph data object to the data object using an identifier of the data object;
        provide a graph data object identifier of the graph data object for linking the graph data object to the data object;

determine a set of associated data objects that are associated with the data object;

for each associated data object, create an associated graph data object if a graph data object corresponding to the associated data object does not exist; and for each created graph data object, create a graph data relation object that represents a relationship between the graph data object and the associated graph data object;

storing created graph data objects, associated graph data objects, and graph data relation objects in the graph database;

providing the graph database to one or more applications;

identifying a new relationship between a first data object and a second data object initiated by a first owner of the first data object;

identifying a second owner of the second data object;

sending an approval request to the second owner for linking, in the graph database, a first graph data object corresponding to the first data object to a second graph data object corresponding to the second data object;

receiving an approval from the second owner in response to the approval request; and linking, in the graph database, the first graph data object to the second graph data object, based on the approval and the new relationship.

11. The non-transitory, computer-readable medium of claim 10, wherein the operations further comprise adding one or more properties to the graph data object based on a set of attributes read from the data object.

12. The non-transitory, computer-readable medium of claim 10, wherein the one or more relational databases include a first database for a first application and a second database for a second application, and wherein the operations further comprise:

identifying one or more inter-application relationships between the first application and the second application that are not represented as a foreign key in the first database or the second database; and for each inter-application relationship, linking, in the graph database, a first graph data object created from the first database with a second graph data object created from the second database.

13. The non-transitory, computer-readable medium of claim 12, wherein the first graph data object and the second graph data object are linked with a linking graph data relation object.

14. The non-transitory, computer-readable medium of claim 12, wherein the first graph data object and the second graph data object are linked with an intermediary graph data object.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving a request to create a graph database from one or more relational databases;

for each relational database:

identify a set of data objects stored in the relational database; and for each data object in the set of data objects stored in the relational database:

create a graph data object that corresponds to the data object;

link the graph data object to the data object using an identifier of the data object;

provide a graph data object identifier of the graph data object for linking the graph data object to the data object;

determine a set of associated data objects that are associated with the data object;

for each associated data object, create an associated graph data object if a graph data object corresponding to the associated data object does not exist; and for each created graph data object, create a graph data relation object that represents a relationship between the graph data object and the associated graph data object;

storing created graph data objects, associated graph data objects, and graph data relation objects in the graph database;

providing the graph database to one or more applications;

identifying a new relationship between a first data object and a second data object initiated by a first owner of the first data object;

identifying a second owner of the second data object;

sending an approval request to the second owner for linking, in the graph database, a first graph data object corresponding to the first data object to a second graph data object corresponding to the second data object;

receiving an approval from the second owner in response to the approval request; and linking, in the graph database, the first graph data object to the second graph data object, based on the approval and the new relationship.

16. The computer-implemented system of claim 15, wherein the operations further comprise adding one or more properties to the graph data object based on a set of attributes read from the data object.

17. The computer-implemented system of claim 15, wherein the one or more relational databases include a first database for a first application and a second database for a second application, and wherein the operations further comprise:

identifying one or more inter-application relationships between the first application and the second application that are not represented as a foreign key in the first database or the second database; and for each inter-application relationship, linking, in the graph database, a first graph data object created from the first database with a second graph data object created from the second database.

18. The computer-implemented system of claim 17, wherein the first graph data object and the second graph data object are linked with a linking graph data relation object.

19. The computer-implemented system of claim 17, wherein the first graph data object and the second graph data object are linked with an intermediary graph data object.

* * * * *